US012734108B2

(12) United States Patent
Wu

(10) Patent No.: US 12,734,108 B2
(45) Date of Patent: Sep. 15, 2026

(54) MULTI-FUNCTIONAL STAGGERED MASSAGER AND MASSAGE EQUIPMENT

(71) Applicants: Dong Guan Hanjing Electronic Technolog Co Ltd, Dongguan (CN); Shenzhen Hijoy Technology Co., Ltd., Shenzhen (CN)

(72) Inventor: Bin Wu, Dongguan (CN)

(73) Assignees: Dong Guan Hanjing Electronic Technolog Co Ltd, Dongguan (CN); Shenzhen Hijoy Technology Co., Ltd., Shenzhen (CN)

( * ) Notice: Subject to any disclaimer, the term of this patent is extended or adjusted under 35 U.S.C. 154(b) by 135 days.

(21) Appl. No.: 19/078,202

(22) Filed: Mar. 12, 2025

(65) Prior Publication Data

US 2026/0014051 A1 Jan. 15, 2026

(30) Foreign Application Priority Data

Jul. 15, 2024 (CN) ........................ 202421660396.8

(51) Int. Cl.
*A61H 23/02* (2006.01)

(52) U.S. Cl.
CPC . *A61H 23/0263* (2013.01); *A61H 2201/0207* (2013.01); *A61H 2201/14* (2013.01);
(Continued)

(58) Field of Classification Search
CPC ........ A61H 19/00; A61H 19/32; A61H 19/30; A61H 1/02; A61H 23/0254; A61H 15/00; A61H 15/0078; A61H 2015/007; A61H 2015/0021; A61H 2015/0042; A61H 2015/0064; A61H 2015/0071; A61H 2201/0207; A61H 2201/14; A61H 2201/149; A61H 2201/1669; A61H 2201/5002; A61H 2201/5005; A61H 2201/503; A61H 2201/5058; A61H 23/0263; A61H 7/004
See application file for complete search history.

(56) References Cited

U.S. PATENT DOCUMENTS

2009/0099413 A1* 4/2009 Kobashikawa ........ A61H 19/44 600/38
2010/0010292 A1* 1/2010 Talbot ................ A61H 23/0263 600/38
(Continued)

*Primary Examiner* — Brandy S Lee

(57) ABSTRACT

A multi-functional staggered massager is provided, comprising a main unit, front and rear massage assemblies detachably mounted on the main unit. The front and rear massage assemblies are driven by the main unit to move synchronously; the front massage assembly is ring-shaped and comprises a support frame and an annular soft massage ring arranged in the support frame; the rear massage assembly is composed of left and right parts that can be disassembled respectively; the left and right parts are configured to relatively fit with each other; during movement, when the rear massage assembly moves, the left and right parts perform synchronously staggered reciprocating rectilinear motions driven by the main unit. Moreover, massage rubber parts at upper and lower sections of the massager can be replaced. Users can select different types of massage rubber parts to meet personalized massage requirements.

10 Claims, 12 Drawing Sheets

(52) U.S. Cl.
CPC ................ *A61H 2201/1669* (2013.01); *A61H 2201/5005* (2013.01); *A61H 2201/503* (2013.01); *A61H 2201/5058* (2013.01)

(56) References Cited

U.S. PATENT DOCUMENTS

| | | | | |
|---|---|---|---|---|
| 2013/0018290 | A1* | 1/2013 | Holdorf | A61H 15/0092 601/128 |
| 2016/0136033 | A1* | 5/2016 | Johnston | A61H 15/0092 601/129 |
| 2021/0113424 | A1* | 4/2021 | Yates | A61F 5/41 |
| 2023/0390147 | A1* | 12/2023 | Sloan | G10L 25/93 |

* cited by examiner

MULTI-FUNCTIONAL STAGGERED MASSAGER AND MASSAGE EQUIPMENT

RELATED APPLICATIONS

The present application claims the benefit of priority of Chinese Patent Application No. 202421660396.8, filed Jul. 15, 2024, and entitled "MULTI-FUNCTIONAL STAGGERED MASSAGER AND MASSAGE EQUIPMENT," the entire content of which is incorporated herein by reference.

TECHNICAL FIELD

The present application relates to the field of massagers, in particular to a multi-functional staggered massager.

BACKGROUND

With the accelerated pace of life in modern society, people's work and living pressure is increasing day by day, and physical fatigue and discomfort are also increasing. In order to alleviate physical fatigue and improve the quality of life, various massagers have come into being. The massager stimulates and relaxes specific parts of the human body by simulating manual massage techniques, so as to achieve the effect of relieving pressure, promoting blood circulation and alleviating muscle fatigue. Therefore, the massagers are more and more widely used in modern families.

At present, there are many kinds of massagers, including hand-held massagers, chair-type massagers and full-body massage chairs. Most of these devices are driven by motors, and the movement and vibration of the massage head are realized through mechanical structure, so as to massage the body parts. However, massagers of the prior art have some shortcomings in practical use:

Limitation by simple functions: Most existing massagers can only realize simple vibration or rolling massage, which cannot meet the needs of users for diversified massage experiences.

Complex structure and difficult maintenance: Some high-end massagers have complex structures, involving multiple power sources and driving mechanisms, with high manufacturing costs. And their maintenance is inconvenient and they are easy to be damaged.

Simple massage effect: The massage effect of the existing massagers is relatively fixed and cannot be adjusted according to the needs of different users, resulting in an unsatisfactory massage experience.

In view of the above shortcomings in the prior art, a novel multi-functional staggered massager has been developed, which is of great significance and value.

SUMMARY

The purpose of the present application is to overcome at least one defect in the prior art and provide a novel multi-functional staggered massager, which is driven by a single power source to realize sectional motion of an upper section and a lower section, wherein the movement of the lower section includes staggered reciprocating motions of the left part and the right part. The internal structure of such a massager is greatly simplified and the manufacturing cost and maintenance difficulty are therefore reduced. Moreover, massage rubber parts at an upper and a lower sections of the massager can be replaced. Users can select different types of massage rubber parts according to their needs to meet personalized massage requirements.

In order to achieve the above purpose, the present application discloses a multi-functional staggered massager, comprising a main unit, a front massage assembly and a rear massage assembly detachably mounted on the main unit, wherein the front massage assembly and the rear massage assembly are driven by the main unit to move synchronously; the front massage assembly is ring-shaped and comprises a support frame and an annular soft massage ring arranged in the support frame; the rear massage assembly is composed of a left part and a right part that can be disassembled respectively; the left part and the right part are configured to relatively fit with each other; during movement, when the rear massage assembly moves, the left part and the right part perform synchronously staggered reciprocating rectilinear motions driven by the main unit.

Further, the left part and the right part of the rear massage assembly are aligned at an initial position; and arc-shaped soft massage blocks are mounted on the left part and the right part.

Further, the main unit comprises a housing, a support frame mounted in the housing, a guide rod set composed of a plurality of parallel and linear guide rods mounted on the support frame, and a first sliding block, a second sliding block and a third sliding block slidably sleeved on at least one guide rod; the main unit further comprises a motor mounted in the housing and a main control board connected to the motor, wherein the first sliding block is connected with the front massage assembly to fit with each other, and the second sliding block and the third sliding block are respectively connected with the left part and the right part to respectively fit with each other; a pulley and an eccentric wheel are sleeved on a main shaft of the motor, the pulley is configured to relatively fit with a driven wheel mounted in the support frame, and a synchronous belt is sleeved between the pulley and the driven wheel; the synchronous belt is connected and fit with the second sliding block and the third sliding block, and the guide rods of the second sliding block and the third sliding block are driven by the motor to perform synchronously staggered reciprocating rectilinear motions; the eccentric wheel is connected and fit with the first sliding block by means of a driving rod to drive the first sliding block to make reciprocating linear motions along the guide rod.

Further, the second sliding block or the third sliding block is provided with magnetic blocks opposite to the main control board, and correspondingly, the main control board is provided with a plurality of magnetic inductors aligned with the magnetic blocks at intervals; the current stroke positions of the second sliding block and the third sliding block can be obtained by fit between the magnetic inductor and the magnetic block; moreover, when adjusting a stroke of the second sliding block and the third sliding block, an induction trigger for adjusting the stroke is realized through the fit between the magnetic inductor and the magnetic block.

Further, the first sliding block, the second sliding block and the third sliding block are respectively provided with clamping holders partially exposing from the main unit; the front massage assembly, the left part and the right part are detachably mounted on corresponding clamping holders.

Further, the main unit is internally provided with a battery, the battery is connected to the main control board and supplies power to the main control board; adaptedly, the main unit is provided with a charging terminal connected to the main control board.

Further, a power supply interface connected to the main control board is provided on the clamping holder; heating wires are arranged inside the front massage assembly and/or the rear massage assembly; the heating wires are substantially electrically connected with the main control board via the power supply interface, and are powered and controlled by the main control board.

Further, a vibrating motor is mounted inside the front massage assembly and/or the rear massage assembly, substantially connected to the main control board via the power supply interface and powered and controlled by the main control board.

Further, the main unit is provided with at least one button connected to the main control board.

Further, the main unit is embedded with at least one display screen/touch screen connected to the main control board.

Compared with the prior art, this application includes at least one of the following beneficial effects:

1. Through the synchronous movements of the front and rear massage assemblies and the synchronously staggered reciprocating rectilinear motions of the rear massage assembly, a variety of massage effects are realized, which is suitable for massaging different parts and improves the diversity and comprehensiveness of the massage experience.
2. The front and rear massage assemblies can be disassembled, which is convenient for users to replace different massage assemblies according to their needs, providing personalized massage experience. In addition, the disassembly design of the assemblies is convenient for cleaning and maintenance, which improves the convenience of use.
3. Driven by a single power source, the complex synchronous staggered motion is realized through the motor, pulley, eccentric wheel and guide rod set, which simplifies the internal structure, reduces the manufacturing cost and maintenance difficulty, and improves the reliability of the device.
4. The main unit is internally provided with a battery, which supplies power to the front and/or rear massage assemblies through the power supply interface. Heating wires and a vibrating motor are provided in the front and rear massage assembles, which are powered and controlled by the main control board. The heating and vibration functions further enhance the massage effect, providing users with a more comfortable and diverse massage experience.

Other features and advantages of the subject technology of this application will be set forth in the following description, and partly will be apparent from that description or may be learned by practicing the subject technology of this application. The advantages of the subject technology of this application will be realized and attained through the structure particularly pointed out in the written specification and claims thereof as well as the drawings.

BRIEF DESCRIPTION OF THE DRAWINGS

Aspects of the present disclosure will be better understood after the following specific embodiments are read in conjunction with the drawings, and the positions, sizes, ranges, etc. of each structure shown in the drawings or the like sometimes do not represent actual positions, sizes, ranges, etc. In the drawings.

DETAILED DESCRIPTION OF THE EMBODIMENTS

Figure 1:
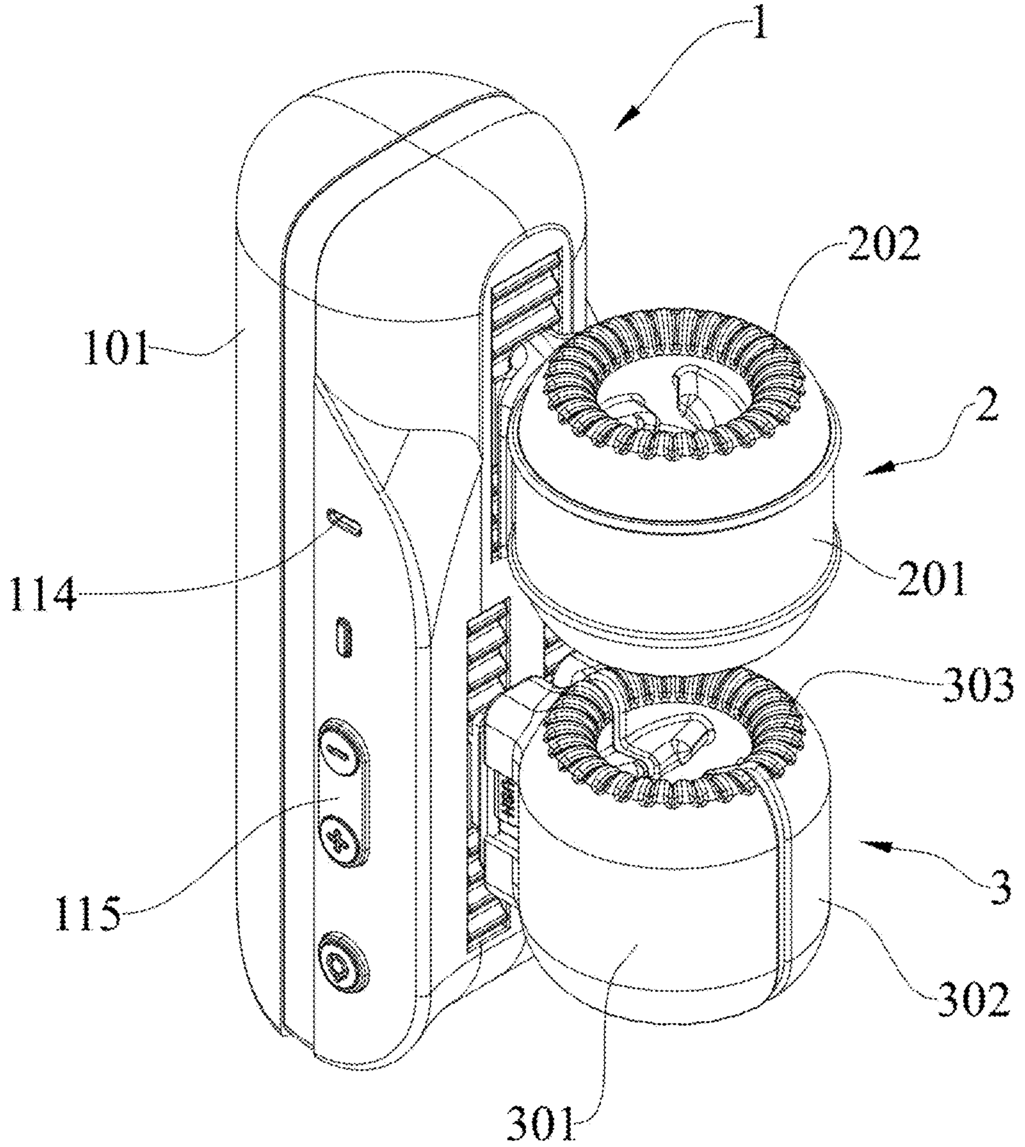
FIG. 1 is a schematic diagram of the overall structure of an embodiment disclosed in this application, in which the rear massage assembly is in its initial position.
Figure 2:
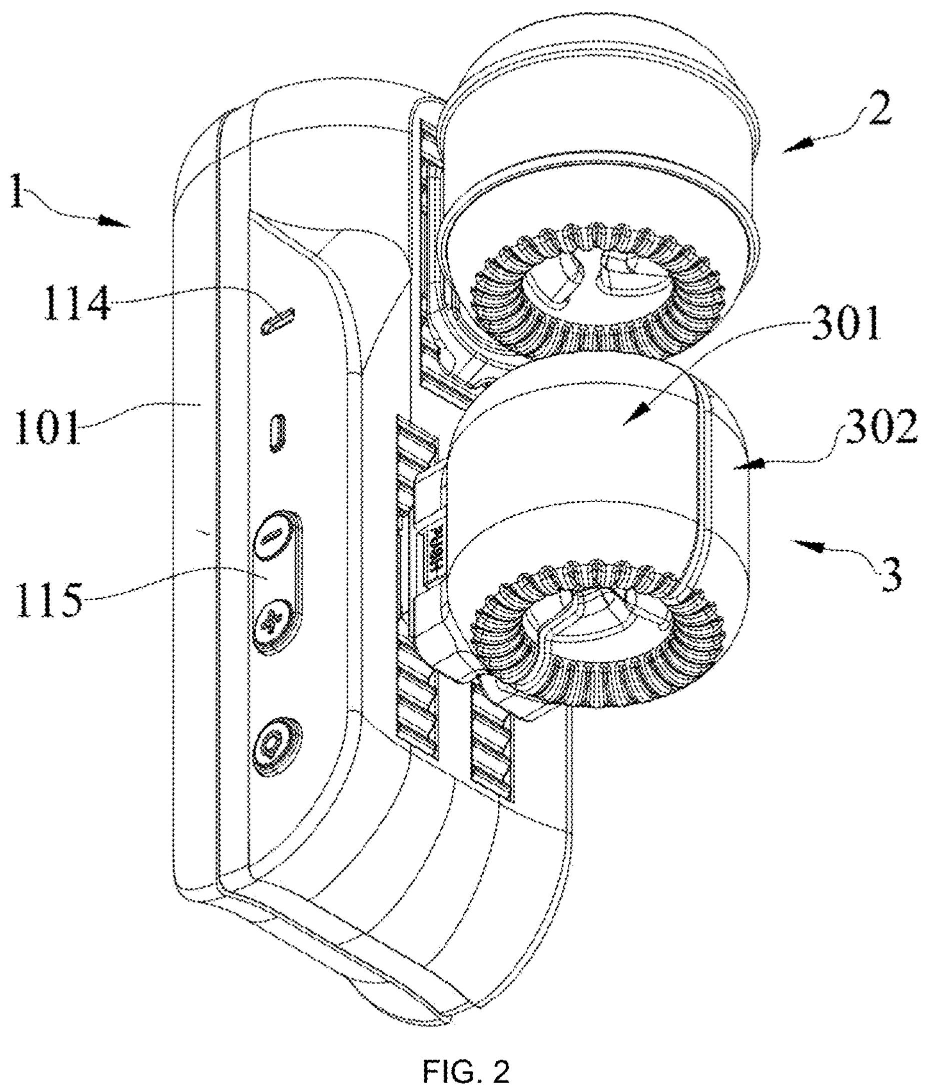
FIG. 2 is a schematic diagram of the overall structure of an embodiment disclosed in this application from another angle of view.
Figure 3:
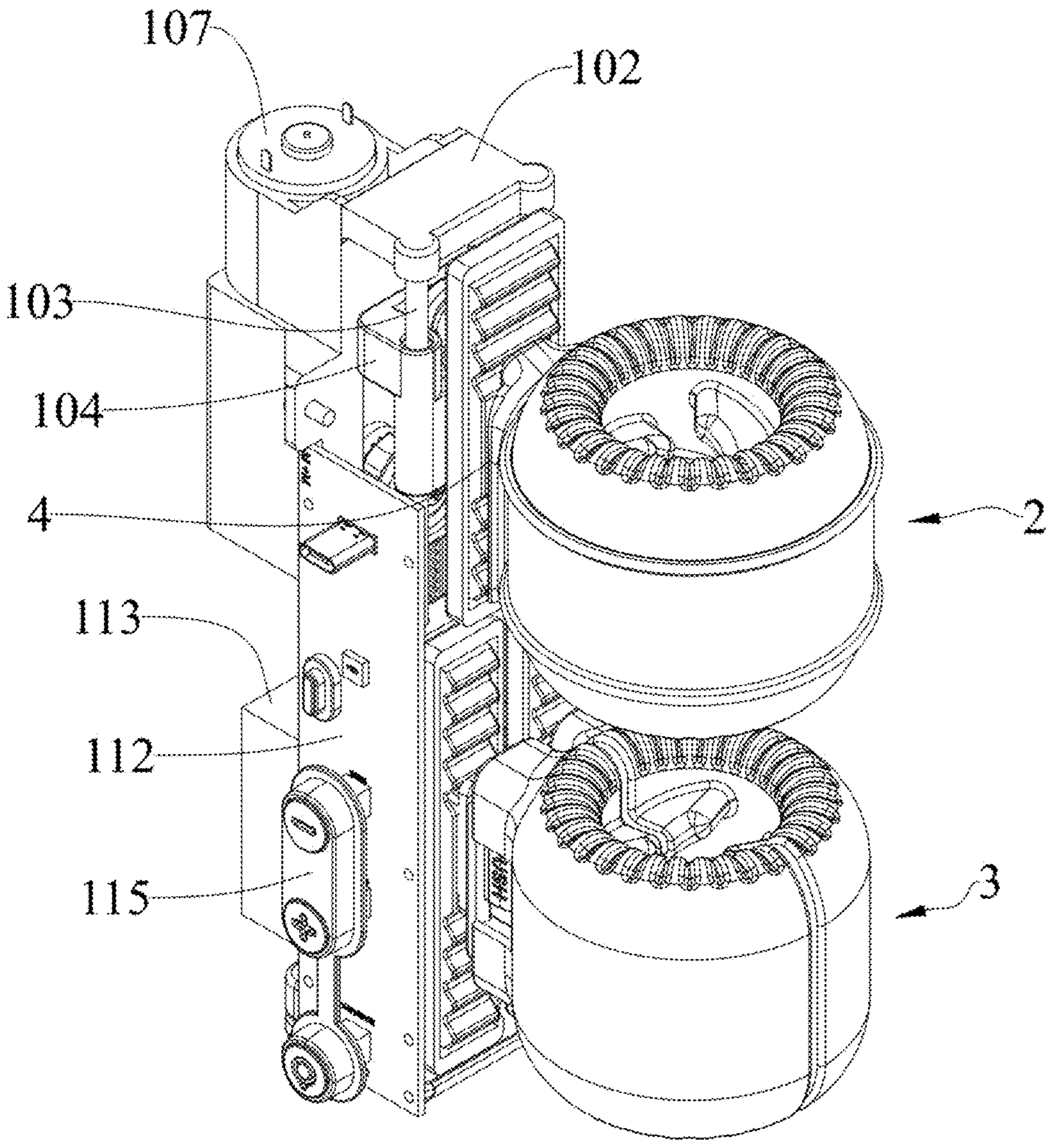
FIG. 3 is a schematic structural diagram of the main unit with the housing removed according to an embodiment disclosed in this application.
Figure 4:
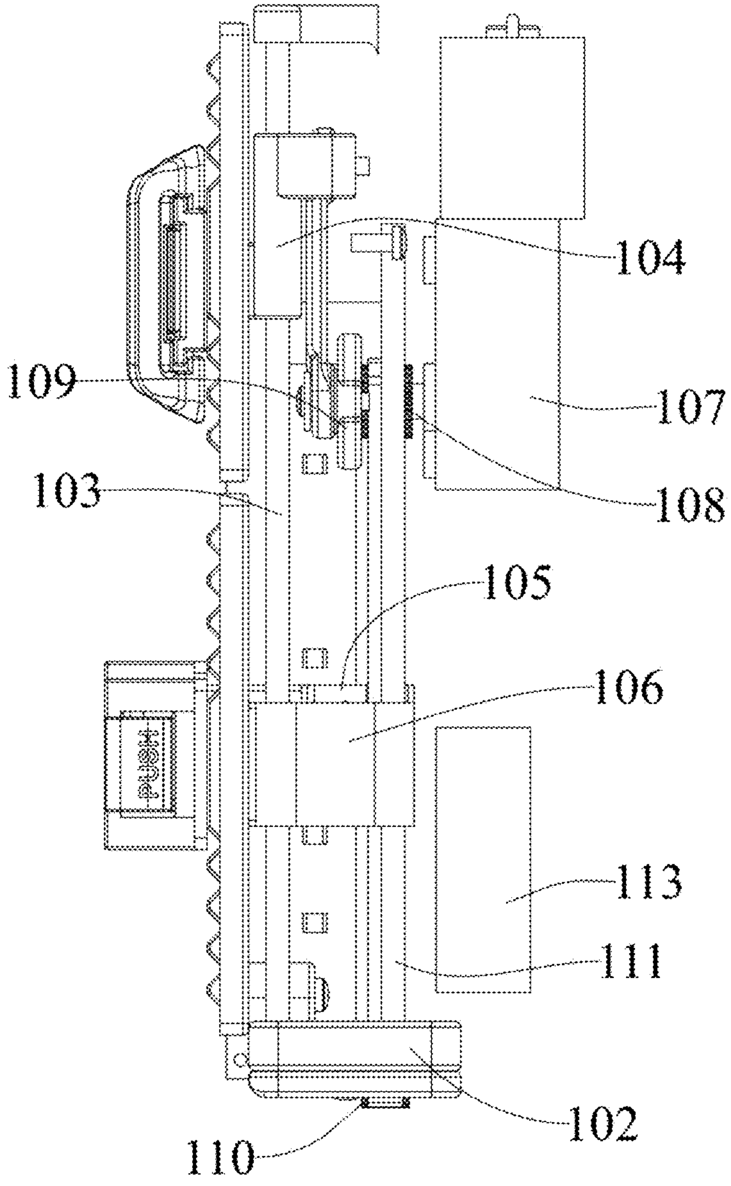
FIG. 4 is a schematic structural diagram of the main unit with the housing removed according to an embodiment disclosed in this application.
Figure 5:
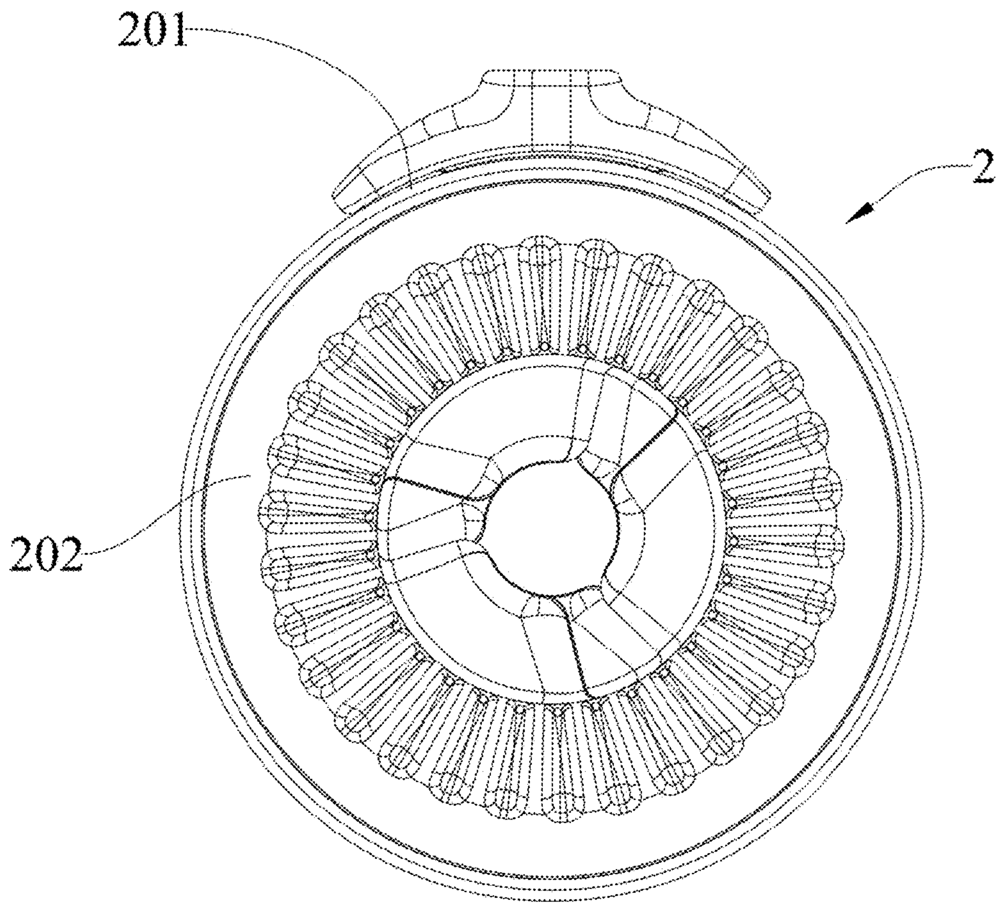
FIG. 5 is a schematic structural diagram of the front massage assembly according to an embodiment disclosed in this application.
Figure 6:
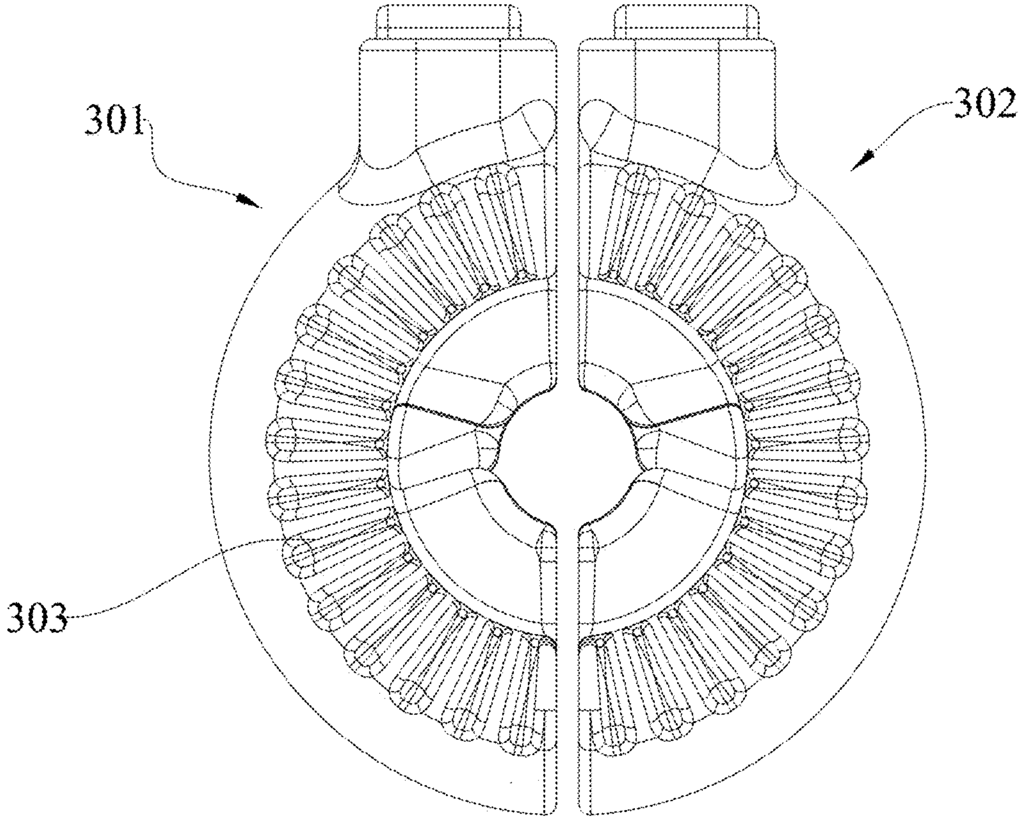
FIG. 6 is a schematic structural diagram of the rear massage assembly according to an embodiment disclosed in this application.
Figure 7:
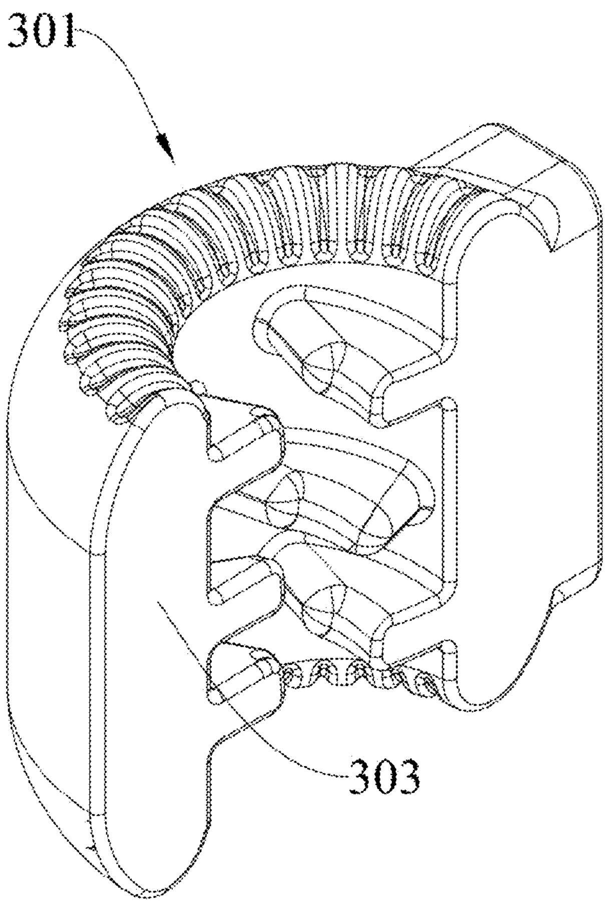
FIG. 7 is a schematic structural diagram of the left part according to an embodiment disclosed in this application.

The present disclosure will be described below with reference to the accompanying drawings, which illustrate several embodiments of the present disclosure. However, it should be understood that the disclosure can be presented in many different ways and is not limited to the embodiments described below. In fact, the embodiments described below are intended to make the disclosure of the application more complete and fully explain the protection scope of the disclosure to those skilled in the art. It should also be understood that the embodiments disclosed herein can be combined in a variety of ways to provide further additional embodiments.

It should be understood that like reference numerals refer to like elements throughout the drawings. In the drawings, dimensions of certain features may be deformed for clarity.

It should be understood that the wording in this specification is only used to describe specific embodiments and is not intended to limit the present disclosure. Unless otherwise defined, all terms used in the specification (including technical terms and scientific terms) have meanings commonly understood by those skilled in the art. For the sake of brevity and/or clarity, techniques, methods, and apparatuses known to those having ordinary skill in the relevant art may not be discussed in detail but should be considered part of the authorized specification where appropriate.

As used in the specification, the singular forms "one", "the" and "this" include the plural forms unless clearly indicated. The terms "including", "comprising" and "containing" used in the specification indicate the presence of the claimed characteristics, but do not exclude the presence of one or more other characteristics. The term "and/or" used in the specification includes any and all combinations of one or more of the items listed.

Embodiment:

As shown in FIGS. 1-9, this embodiment discloses a multi-functional staggered massager, comprising a main unit 1, a front massage assembly 2 and a rear massage assembly 3. The massager realizes a variety of massage effects through new structures and motion modes, providing users with comfortable and convenient massage experience.

The main unit 1 is the core of the massager and includes a housing 101 for accommodating and protecting internal components. The housing 101 is made of high-strength plastic or metal material to ensure a robust and durable structure. A support frame 102 is mounted in the housing 101, and a plurality of parallel and linear guide rods 103 are arranged on the support frame 102. The guide rods 103 are made of stainless steel or aluminum alloy material to ensure guiding accuracy and wear resistance.

On the guide rod 103, a first sliding block 104, a second sliding block 105 and a third sliding block 106 are slidably sleeved. The first sliding block 104 is connected to the front massage assembly 2, and the second sliding block 105 and the third sliding block 106 are respectively connected to the left part 301 and the right part 302 of the rear massage assembly 3. In order to facilitate the mounting and removal of the front massage assembly 2 and the rear massage assembly 3, the first sliding block 104, the second sliding block 105 and the third sliding block 106 are respectively mounted with a clamping holder 4 partially exposing from the main unit. The front massage assembly 2, the left part 301 and the right part 302 are detachably mounted on the corresponding clamping holders 4.

It will be appreciated that each sliding block is made of a high-strength engineering plastic, which ensures smooth sliding on the guide rod while reducing friction and wear.

In this embodiment, the front massage assembly 2 is annular and includes a support frame 201 and an annular soft massage ring 202 arranged in the support frame 201. The support frame 201 is made of durable plastic or lightweight metal, and the annular soft massage ring 202 is made of medical-grade silicone material to provide a soft and comfortable touch.

The front massage assembly 2 is mounted on the first sliding block 104 via the clamping holder 4, and a part of the clamping holder 203 is exposed from the main unit 1, which is convenient for disassembly and replacement.

In this embodiment, the rear massage assembly 3 is composed of a left part 301 and a right part 302. The left part 301 and the right part 302 are configured to relatively fit with each other and aligned at an initial position.

Arc-shaped soft massage blocks 303 are mounted on the left part 301 and right part 302. These massage blocks 303 are made of medical grade silicone material to provide a comfortable massage experience.

Further a motor 107 is provided in the main unit 1, and the motor 107 serves as a power source of the massager. The motor 107 is connected to a pulley 108 and an eccentric wheel 109 via the main shaft. The pulley 108 is configured to relatively fit with a driven wheel 110 mounted in the support frame 102, and a synchronous belt 111 is sleeved on the driven wheel 110 and the pulley 108. At the same time, the synchronous belt 111 is connected with the second sliding block 105 and the third sliding block 106 to realize the synchronously staggered reciprocating linear motions of the rear massage assembly 3.

The eccentric wheel 109 is connected with the first sliding block 104 by means of a driving rod 112 to drive the front massage assembly 2 to reciprocate linearly. The synchronous belt 111 is made of a high-strength rubber material to ensure the stability and durability of transmission.

In this embodiment, the motor 107 is controlled by a main control board 112. The main control board 112 is mounted in the main unit 1 and connected to the motor 107. When the motor 107 operates, controllable forward rotations and reverse rotations are realized through the main control board 112 to drive the pulley 108 to perform corresponding forward rotations and reverse rotations, so as to drive the second sliding block 105 and the third sliding block 106 to perform synchronously staggered reciprocating linear motions on the guide rod 103, and the left part 301 and the right part 302 realize opposite staggered circular motions. At the same time, the eccentric wheel 109 drives the first sliding block 104 to make a reciprocating linear motion along the guide rod 103 by means of the driving rod 112, so as to realize the reciprocating motions of the front massage assembly 2.

The main unit 1 is internally provided with a battery 113, which is connected to the main control board 112 and supplies power to the main control board 112. Meanwhile, the main unit 1 is provided with a charging terminal 114 to facilitate charging of the battery 113.

Figure 8:
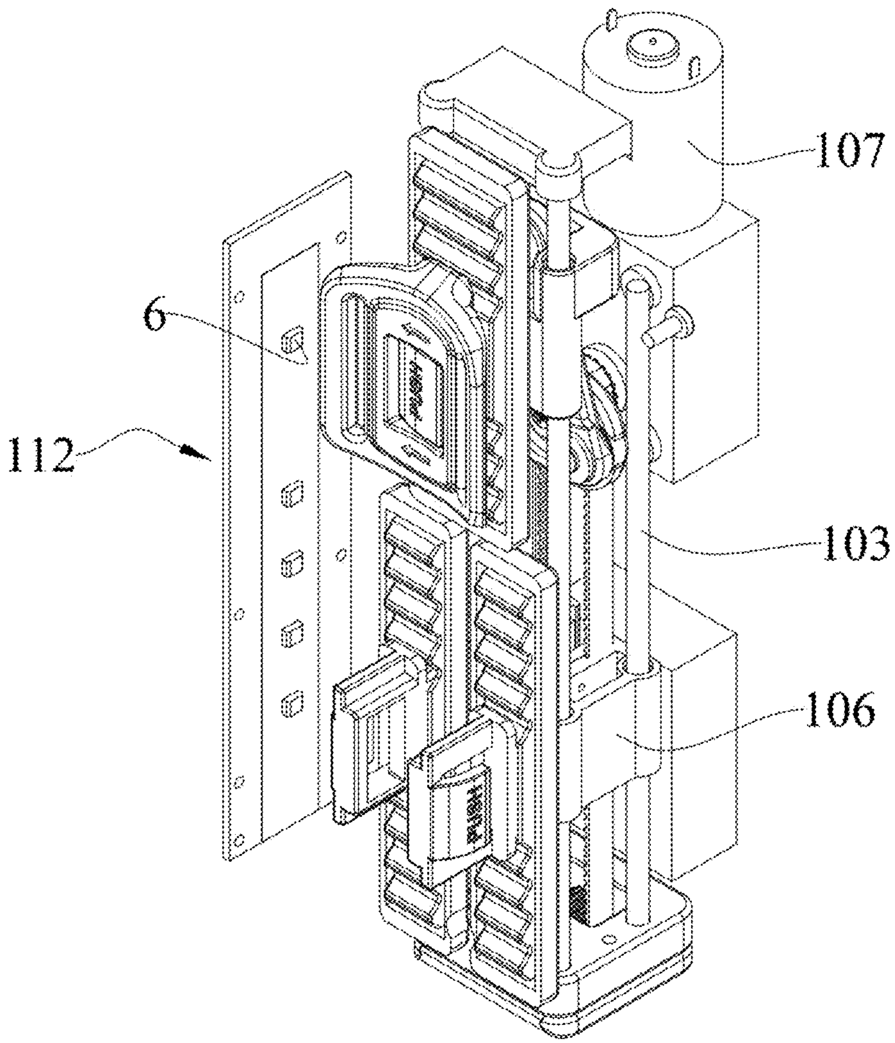
FIG. 8 is a schematic structural diagram of the main unit from another angle of view with the housing removed according to an embodiment disclosed in this application.
Figure 9:
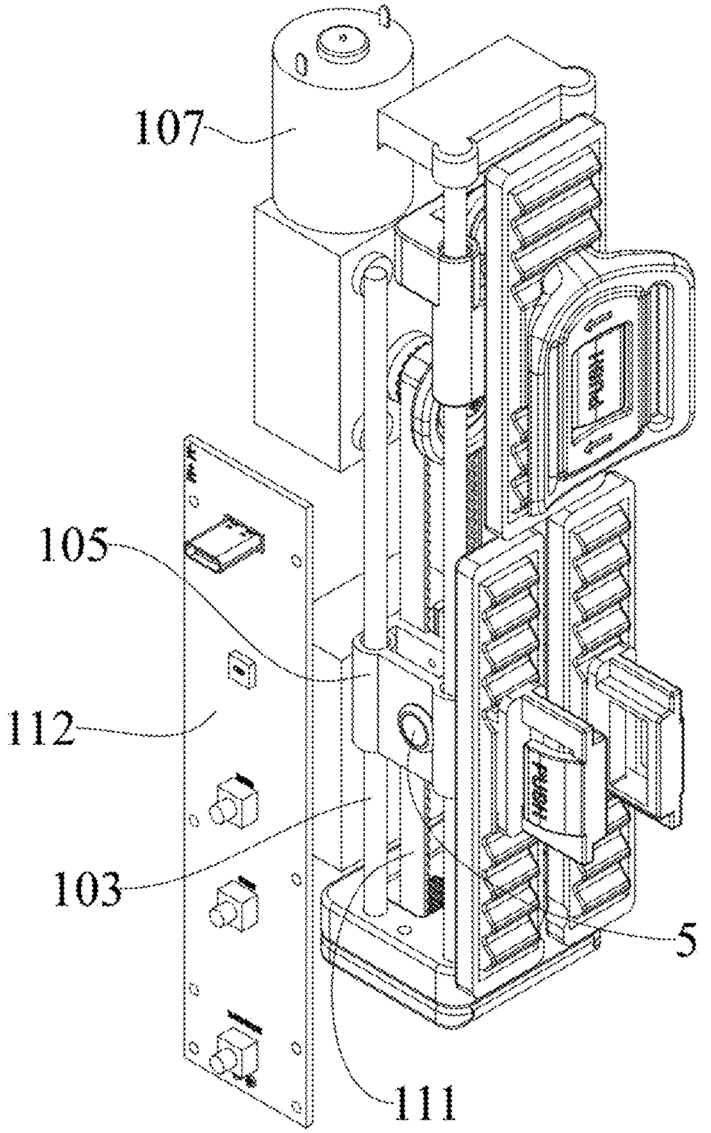
FIG. 9 is a schematic structural diagram of the main unit from further another angle of view with the housing removed according to an embodiment disclosed in this application.
Figure 10:
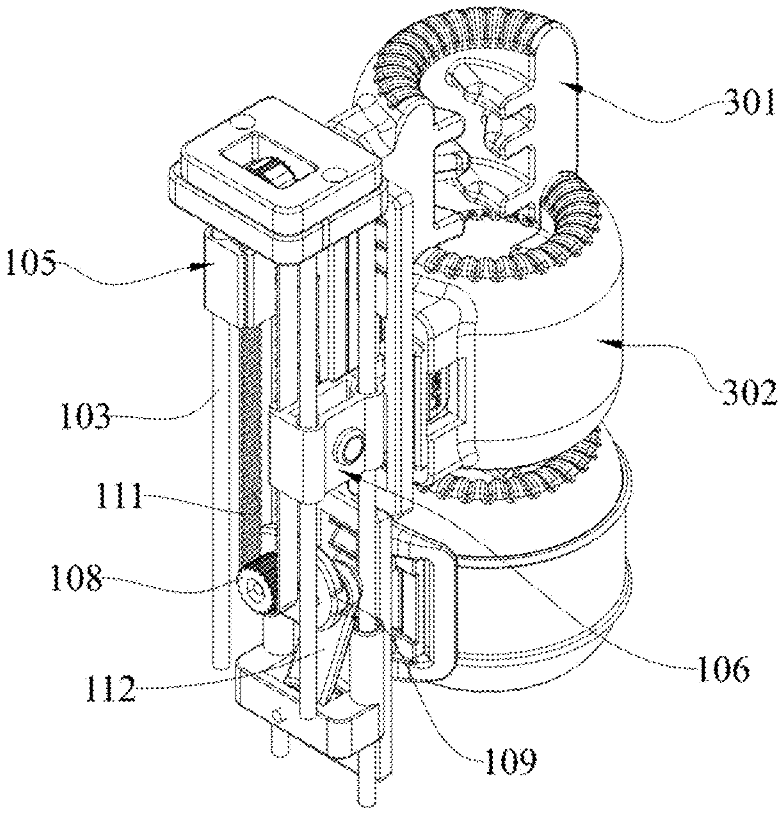
FIG. 10 is a schematic structural diagram of an embodiment of this application with part of the housing and components removed, in which the left part and the right part are in a staggered working state.
Figure 11:
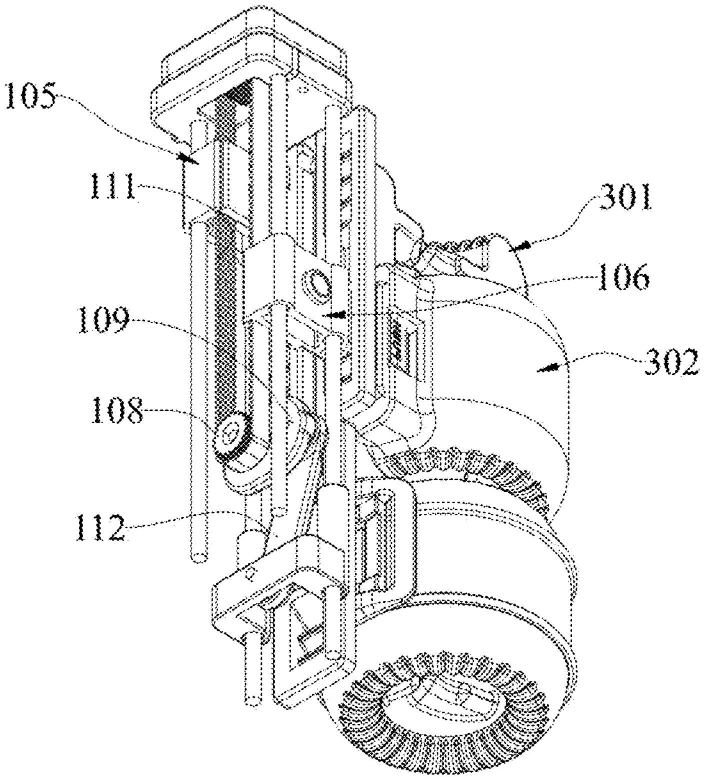
FIG. 11 is a schematic structural diagram of an embodiment of this application from another angle of view with part of the housing and components removed, in which the left part and the right part are in a staggered working state.
Figure 12:
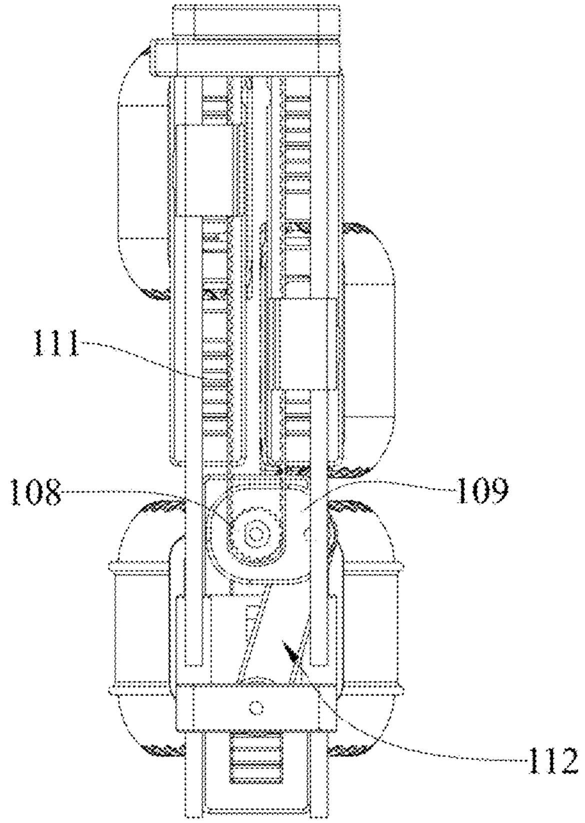
FIG. 12 is a schematic structural diagram of an embodiment of this application from further another angle of view with part of the housing and components removed, in which the left part and the right part are in a staggered working state.

As a preferred alternative, in the multi-functional staggered massager, a magnetic block 5 is optionally mounted on the second sliding block 105 or the third sliding block 106, i.e. only one sliding block is provided with the magnetic block 5. In this embodiment, as shown in FIGS. 8 and 9, the magnetic block 5 is specifically mounted on the second sliding block 105.

In contrast to the above structure, the main control board 112 is provided with a plurality of magnetic inductors 6 aligned and fitted with the magnet blocks 5 at intervals.

More specifically, the magnetic block 5 is fixed to the second sliding block 105 and is usually made of a high-performance rare earth magnetic material (e.g., neodymium iron boron) in order to ensure sufficient magnetism. The shape and size of the magnetic block 5 are customized according to the design of the sliding block, so as to ensure that it can always be aligned with the magnetic inductor 6 during the movement of the sliding block. In this embodiment, the magnetic block 5 is a cylinder structure.

The magnetic inductor 6 is mounted on the main control board 112, and the main control board 112 is fixed to an internal structure of the main unit 1. The magnetic inductors 6 are arranged at a certain interval to ensure that the magnetic block 5 can always be sensed in the entire stroke range of the sliding block. The magnetic inductor 6 is usually a Hall-effect sensor, which has high sensitivity and high resolution and can accurately detect the position of the magnetic block 5.

In this massager, the second sliding block 105 and the third sliding block 106 are synchronized by the synchronous belt 111. The motor 107 drives the pulley 108, and the pulley 108 drives the synchronous belt 111 so that the second sliding block 105 and the third sliding block 106 perform reciprocating linear motions. Due to the synchronism of the two sliding blocks, only one sliding block is equipped with a magnetic block 5 to monitor and control the movement of the two sliding blocks.

When the sliding block (the second sliding block 105 in this embodiment) on which the magnetic block 5 is mounted slides on the guide rod 103, the magnetic block 5 moves along with it. The magnetic inductor 6 detects a change in the magnetic field of the magnetic block 5 and generates corresponding electric signals, which are transmitted to the main control board 112. The main control board 112 calculates the current positions of the second sliding block 105 and the third sliding block 106 by analyzing signals from the magnetic inductor 6.

During operation, a user selects and adjusts the stroke of the second sliding block 105 and the third sliding block 106 via the button 115 or the touch display screen on the main unit 1. The main control board 112 controls the operation of the motor 107 according to a stroke setting input by a user. The motor 107 moves the second sliding block 105 and the third sliding block 106 to set positions by means of the synchronous belt 111. The magnetic inductor 6 detects the position change of the sliding block in real time, and feeds back information to the main control board 112. The main control board 112 precisely controls the speed and direction of the motor according to the feedback information, so as to ensure that the sliding block reaches the preset stroke position.

When the sliding block reaches the set position, the magnetic inductor 6 detects a change in the magnetic field at a specific location and triggers a corresponding sensing signal. After receiving the sensing signal, the main control board 112 immediately stops the operation of the motor to ensure that the sliding block accurately stops at a preset position.

Assuming that a user wishes to move the second sliding block 105 to a stroke midpoint, the user inputs an instruction of the stroke midpoint via the button 115. The main control board 112 receives the instruction and calculates a corresponding stroke distance. The motor 107 is driven to move the second sliding block 105 and the third sliding block 106 by means of the synchronous belt 111. During the movement of the sliding block, the position of the magnetic block 5 is constantly changed and this change is detected by the magnetic inductor 6 which generates continuous electrical signals. The main control board 112 processes these signals in real time to calculate the current position of the sliding block. As the sliding block approaches the midpoint position, the main control board 112 gradually reduces the rotational speed of the motor to precisely control the final position of the sliding block. When the sliding block reaches the midpoint position, the magnetic inductor 6 sends out a trigger signal of the preset position, and the main control board 112 immediately stops the motor operation to complete the stroke adjustment.

Through the above design, a high precision and reliability in the sliding block position detection and stroke adjustment is achieved, ensuring the effectiveness of the massager and the comfort in user experiences.

As a preferred alternative, the front massage assembly 2 and/or the rear massage assembly 3 are internally provided with heating wires and a vibrating motor (not shown in the figure).

The heating wire is powered and controlled by the main control board 112, and the heating function improves the comfort of massage, especially in cold weather. The vibrating motor is also powered and controlled by the main control board 112, and the vibration function increases the versatility and effectiveness of the massage.

During use, a user can select and adjust the massage mode, intensity, heating and vibration functions via the button 115 on the main unit 1 to enjoy a personalized massage experience.

This embodiment further illustrates the massage process performed by the multi-functional staggered massager. The construction and mode of operation of the massager are as previously described.

Taking the massage arm as an example, when a user is ready to massage his/her arms, firstly, the front massage assembly 2 and the rear massage assembly 3 are correctly mounted on the clamping holder 4 of the main unit 1.

The user inserts his/her arms into the front massage assembly 2 and the rear massage assembly 3 such that the arms are located inside the annular soft massage ring 202, and wrapped by both the left part 301 and the right part 302 of the rear massage assembly 3. At the moment, the user selects an appropriate massage mode and intensity via the button 115 on the main unit 1.

After the massager is started, the motor 107 starts to operate and the main control board 112 controls the motor 107 to perform controllable forward rotations and reverse rotations. An opposing staggered cyclic movement of the left part 301 and right part 302 is achieved. At the same time, the front massage assembly 2 is driven to perform reciprocating linear motions.

During the massage process, the annular soft massage ring 202 of the front massage assembly 2 performs a gentle circular massage on the upper part of the arm, and the left part 301 and the right part 302 of the rear massage assembly 3 perform a strong pushing massage on both sides and the lower part of the arm by means of synchronously staggered reciprocating linear motions. This design allows the arms to be massaged in multiple directions simultaneously, effectively relieving muscle tension and promoting blood circulation.

If a user selects the heating function, the main control board 112 will supply power to the heating wires in the front massage assembly 2 and the rear massage assembly 3, providing a warm heat treatment effect and further relieving arm fatigue. If the vibration function is selected, the vibrating motor will also be started to increase the depth and effect of massage, making the massage process more comfortable and effective.

During the whole massage process, depending on the specific structure, a user can check the current massage status and mode in real time through the display screen or indicator light on the main unit 1 and adjust them at any time as needed. After the massage is finished, the user only needs to turn off the massager and take out his/her arm from the massage assembly.

According to an embodiment of the present application, multi-functional massage equipment is further provided. The multi-functional massage equipment includes the above-mentioned multi-functional staggered massager. The multi-functional massage equipment has at least corresponding functions of the above-mentioned multi-functional staggered massager.

To sum up, this embodiment describes the massage process of an arm by a multi-functional staggered massager in detail. Through the coordinated movement of the front and rear massage assemblies, an all-round and multi-angle massage effect is achieved, providing a comfortable and effective arm massage experience, further demonstrating the advantages and practicability of the massager.

Although exemplary embodiments of the present disclosure have been described, it should be understood by those skilled in the art that various variations and changes can be made to the exemplary embodiments of the present disclosure without departing substantially from the spirit and scope of the present disclosure. Therefore, all changes and alterations are contained within the scope of protection of this disclosure as defined by the claims. This disclosure is defined by the appended claims, and equivalents of these claims are also included.

The invention claimed is:

1. A multi-functional staggered massager, comprising a main unit, a front massage assembly and a rear massage assembly detachably mounted on the main unit, wherein the front massage assembly and the rear massage assembly are driven by the main unit to move synchronously; the front massage assembly is ring-shaped and comprises a support frame and an annular soft massage ring arranged in the support frame; the rear massage assembly is composed of a left part and a right part that can be disassembled respectively; the left part and the right part are configured to relatively fit with each other; during movement, when the rear massage assembly moves, the left part and the right part perform synchronously staggered reciprocating rectilinear motions driven by the main unit; the front massage assembly and the rear massage assembly are located out of the main unit;

wherein the main unit comprises a housing, a support frame mounted in the housing, a guide rod set composed of a plurality of parallel and linear guide rods mounted on the support frame, and a first sliding block, a second sliding block and a third sliding block slidably sleeved on at least one guide rod; the main unit further comprises a motor mounted in the housing and a main control board connected to the motor, wherein the first sliding block is connected with the front massage assembly to fit with each other, and the second sliding block and the third sliding block are respectively connected with the left part and the right part to respectively fit with each other; a pulley and an eccentric wheel are sleeved on a main shaft of the motor, the pulley is configured to relatively fit with a driven wheel mounted in the support frame, and a synchronous belt is sleeved between the pulley and the driven wheel; the synchronous belt is connected and fit with the second sliding block and the third sliding block, and the second sliding block and the third sliding block are driven by the motor to perform synchronously staggered reciprocating rectilinear motions along the guide rod; the eccentric wheel is connected and fit with the first sliding block by means of a driving rod to drive the first sliding block to make reciprocating linear motions along the guide rod.

2. The multi-functional staggered massager according to claim 1, wherein the left part and the right part of the rear massage assembly are aligned at an initial position, and arc-shaped soft massage blocks are mounted on the left part and the right part.

3. The multi-functional staggered massager according to claim 1, wherein the second sliding block or the third sliding block is provided with magnetic blocks opposite to the main control board, and correspondingly, the main control board is provided with a plurality of magnetic inductors aligned with the magnetic blocks at intervals; the current stroke positions of the second sliding block and the third sliding block are capable of being obtained by fit between the magnetic inductor and the magnetic block; moreover, an induction trigger for adjusting the stroke is configured to be realized through the fit between the magnetic inductor and the magnetic block when a stroke of the second sliding block and the third sliding block is adjusted.

4. The multi-functional staggered massager according to claim 1, wherein the first sliding block, the second sliding block and the third sliding block are respectively provided with clamping holders partially exposed from the main unit; the front massage assembly, the left part and the right part are detachably mounted on corresponding clamping holders.

5. The multi-functional staggered massager according to claim 4, wherein a power supply interface connected to the main control board is provided on the clamping holder; heating wires are arranged inside the front massage assembly and/or the rear massage assembly; the heating wires are electrically connected with the main control board via the power supply interface, and are powered and controlled by the main control board.

6. The multi-functional staggered massager according to claim 1, wherein the main unit is internally provided with a battery, the battery is connected to the main control board and supplies power to the main control board;

the main unit is provided with a charging terminal connected to the main control board.

7. The multi-functional staggered massager according to claim 1, wherein a vibrating motor is mounted inside the front massage assembly and/or the rear massage assembly, substantially connected to the main control board via the power supply interface and powered and controlled by the main control board.

8. The multi-functional staggered massager according to claim 1, wherein the main unit is provided with at least one button connected to the main control board.

9. The multi-functional staggered massager according to claim 1, wherein at least one display screen/touch display screen connected to the main control board is embedded on the main unit.

10. A multifunctional massage equipment, comprising the multi-functional staggered massager according to claim 1.

* * * * *